Patented June 17, 1924.

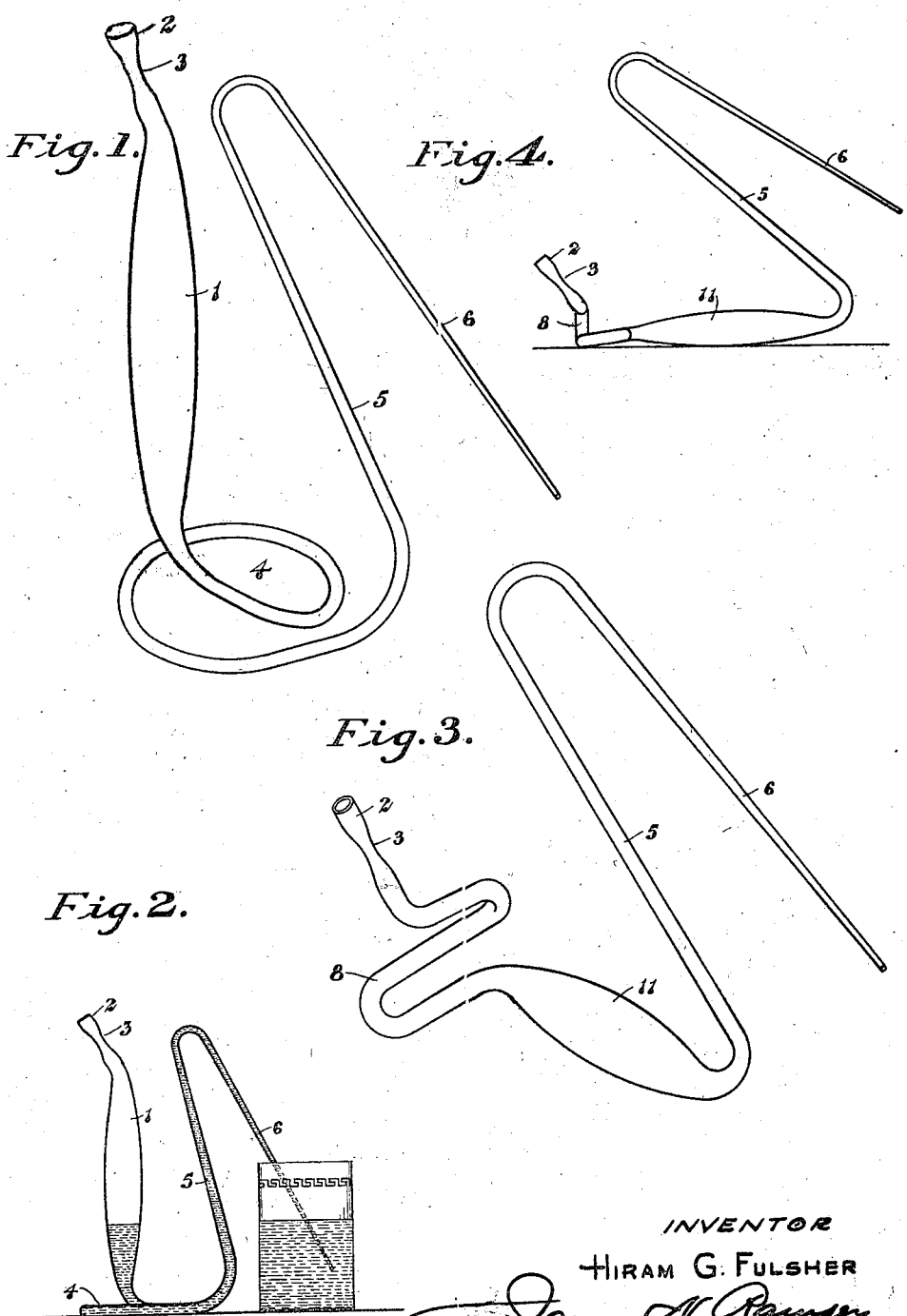
June 17, 1924.  1,498,443
H. G. FULSHER
TUBE FOR SIPHONING, WEIGHING, AND SUBSEQUENT TITRATION OF ACIDS, AMMONIA, OR OTHER SOLUTIONS
Filed Nov. 9, 1922  2 Sheets-Sheet 1
INVENTOR
Hiram G. Fulsher
BY James N. Ramsey
ATTORNEY

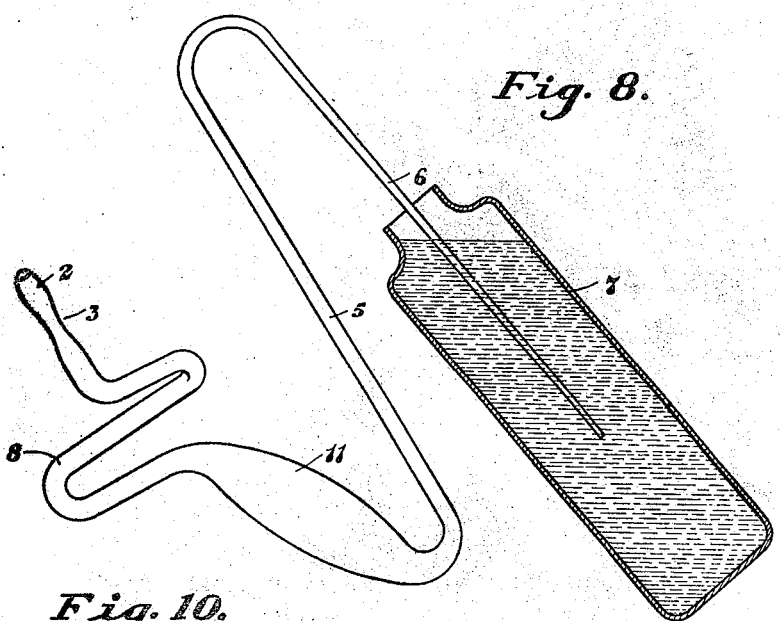

1,498,443

UNITED STATES PATENT OFFICE.

HIRAM G. FULSHER, OF CINCINNATI, OHIO.

TUBE FOR SIPHONING, WEIGHING, AND SUBSEQUENT TITRATION OF ACIDS, AMMONIA, OR OTHER SOLUTIONS.

Application filed November 9, 1922. Serial No. 599,940.

*To all whom it may concern:*

Be it known that I, HIRAM G. FULSHER, a citizen of the United States, residing at Cincinnati, in the county of Hamilton and State of Ohio, have invented certain new and useful Improvements in Tubes for Siphoning, Weighing, and Subsequent Titration of Acids, Ammonia, or Other Solutions, of which the following is a specification.

My invention relates to means for siphoning, weighing and subsequent titration of acids, ammonia and other volatile or and hydroscopic solutions.

The objects of my invention are to provide simple, convenient, efficient and economical means for weighing and subsequent titration of acids, ammonia or other volatile or hydroscopic liquids soluble in water in order to prevent loss by evaporation or vaporization of ammonia, oleum and the like; to prevent absorption of moisture by sulphuric-acid, oleum and the like, and to insure the ready and convenient weighing of liquids which decompose in water, such as chlorosulphonic-acid without the use of a volumetric flask or other graduated equipment since the total quantity weighed is titrated.

My invention consists in the unique formation and construction of the tube and in the method of using the same.

In the drawings:

Fig. 1 is a perspective view of a tube which I designate a siren tube;

Fig. 2 is a side view thereof showing the loading of the tube by suction;

Fig. 3 is a perspective view of a tube which I designate a swan tube;

Fig. 4 is a side view thereof;

Fig. 5 is a longitudinal section of glass tube before it is shaped;

Fig. 6 is a view of the same after the bulb has been formed and before the capillary tube has been drawn;

Fig. 7 is a view of the device after the capillary tube has been drawn;

Fig. 8 is a perspective view of the device showing it in relation to a bottle in section from which the solution is being siphoned;

Fig. 9 is a longitudinal section of a flexible rubber tube having a glass tube mouth piece inserted therein for use in starting the siphon by suction in case of the swan tube and loading the tube in case of the siren tube; and Fig. 10 is a longitudinal section of the flexible rubber mouth piece for use in washing the tube.

The tubes are made from ordinary glass tubing of convenient diameter. Tough elastic glass will last better. A small elongated or oval bulb of desired dimension is blown in the glass tube. Then at one end of the bulb and close to it a long capillary tube is drawn and is preferably tapering toward the open end of the siphon to provide adequate support for the siphon and bulb, to permit the tube to be more readily washed out and to contract the open end of the siphon to prevent bumping or loss while unloading. This capillary tube should be of such a diameter as to allow the solution to be titrated to flow freely and yet not large enough to make the instrument cumbersome for use. Its length will vary with the length of siphon desired. The capillary tube will be from ten to fifteen inches long ordinarily. The capillary tube is bent in the desired shape as shown in the drawings beginning next to the bulb. At the other end in the case of the swan tube the support is bent beginning next the bulb and in both the swan and siren tubes the neck is preferably constricted and a nipple molded with rounded end.

In the embodiment of my invention as illustrated and which shows preferred constructions and referring particularly to Figs. 1 and 2 the siren tube is formed in substantially the shape shown with upright bulb 1 having nipple 2 connected by constricted neck 3 and supported in upright position by curved base 4 which also supports arms 5 and 6 of the siphon. The base is preferably formed of larger tubing than the siphon. The bulb and the siphon must be bent so that their weight comes as near as possible over the center of the base in order that the upright position of the tube may be stable when supported by the base. The angles between the arms of the siphon must be sufficient to receive one edge of the bottle or container 7 readily as shown in Fig. 8. The space in the inverted U tube of the siphon should be large enough to readily receive the neck of the bottle or the side of the container holding the solution to be titrated.

Referring to the swan tube illustrated in Figs. 3, 4 and 8 the construction and arrangement of the nipple, neck and siphon tube are substantially the same as in the siren tube but the bulb 11 in the swan tube is disposed horizontally instead of uprightly and forms part of the base which has connected thereto between one end and the neck a double U tube 8 serving as a base, one-half of the U tube being horizontal and the other half being vertical, but the siren and the swan tubes are loaded and unloaded in the same manner. The loading is done by the attachment of a piece of rubber tubing 9 which fits the nipple 2 to a short piece of glass tubing 10 rounded at both ends. One end of the rubber tubing is attached to the nipple and the other to the short piece of glass tubing 10. By putting the end of the siphon into the liquid and the mouth over the piece of glass tubing 10 and sucking gently the swan siphon is started or the siren is loaded. After the tube is loaded the open end of the siphon should be wiped off carefully before weighing. This weight minus the weight of the tube just before the operation gives the weight of the liquid used. In the case of the siren gentle suction must be applied after the open end is lifted off the surface of the solution until the arm connecting this open end to the other end of the siphon is empty to the height of the liquid in the bulb otherwise it will drip. In the case of the swan tube no such precaution is necessary as the complete bulb is lower than the siphon arms. If desired to hasten loading a continuous suction may be applied during the complete loading of the siren tube although it may be entirely loaded by siphoning. In the case of the swan tube when the siphon is once started the bulb fills automatically, the siphon being broken when the end is pulled out of the acid or ammonia container. The piece of glass tubing and rubber are always kept dry and attached to each other. Another piece of similar rubber tubing 12 is used to unload the tubes. The rubber tube 12 is placed over the end of nipple 2 and the end of the siphon into the flask where the titration is to be made and by blowing on the rubber tubing the bulb is emptied. The delivery end of the wash bottle is pushed into the rubber attached to the nipple and water blown through the tube to wash out any excess solution that adheres to the inside of the weighing tube.

The size of the capillary tube is larger in case of viscous liquids and smaller in case of very volatile liquids. The neck must be made smaller also in the case of very volatile liquids. The bulb must be blown in either tube to a size convenient to hold the desired quantity of solution to be titrated. In the case of an upright bulb on the siren tube one can estimate by the height of this solution in the bulb whether he has a suitable quantity for any desired titration. The swan tube is more suitable for very volatile liquids as one can load it rapidly without suction after the siphon is started, but the size of the load cannot be judged as accurately as in the case of the siren tube with the upright bulb. Except for the variations above mentioned the tubes may be used interchangeably in most titrations.

This equipment will be used instead of the ordinary snake tube or the Dely weighing tube or the weighing bottle-pipette-volumetric flask method. It is superior to the snake tube or Dely tube in that no drying is required as liquid cannot run out through the siphon or down onto the balance pan and in titrations in distilled water a small amount of distilled water remaining in the tubes does not vitiate the results of the titration. The small capillary tube makes it convenient to load from bottles, flasks, etc., without pouring from a bottle or other open container. The tubes set upright in the balance or on the table when desired and the small capillary tube and constricted neck prevent loss by evaporation during the weighing operation. They are more conveniently loaded and unloaded than the ordinary snake tube or the Dely weighing tube.

My invention is more advantageous than the weighing-bottle-pipette-volumetric flask method because it saves loss by volatilization and saves time by the use of one instrument instead of several. Time is saved and direct results obtained by the complete titration of the total quantity weighed.

While I have shown and described particular forms of the invention it will be understood that it may be still further modified in shape without departing from the scope or spirit of the claims, as for instance while I have shown a nipple having a constricted neck, the nipple itself may be constricted, and while I have shown a tube having a bulb, a tube having the original diameter may be coiled and used in its place.

What I claim as new and desire to secure by Letters Patent is:

1. A tube for siphoning, weighing and subsequent titration of acids, ammonia or other solutions, comprising a capillary siphon tube, a nipple and an intermediate tube having a bulb and bent in shape to support the respective ends of the tube in elevated position to permit weighing of the liquid contents without leakage or loss by evaporation.

2. A tube for siphoning, weighing and subsequent titration of acids, ammonia or other solutions, comprising a capillary siphon tube having a bulb connected thereto, a nipple having a constricted neck, a tube connected to said bulb, and said tube being so formed as to support its open ends in elevated position.

3. A tube for siphoning, weighing and subsequent titration of acids, ammonia or other solutions, comprising an inverted U-shaped capillary tube having a curved tubular base and having an upright bulb connected thereto and supported thereby and a nipple having a constricted neck connected to said bulb.

4. A tube for siphoning, weighing and subsequent titration of acids, ammonia or other solutions, comprising a capillary siphon tube having a supporting tubular base and a nipple having a constricted neck connected to and supported by said base.

5. A tube for siphoning, weighing and subsequent titration of acids, ammonia or other solutions, comprising a siphon tube, an elongated bulb connected thereto, a tube connected to said bulb and a nipple having a constricted neck connected to said tube, said tube and said bulb forming a base whereby the open end of said siphon and of said nipple, respectively, are supported in elevated position.

6. A tube for siphoning, weighing and subsequent titration of acids, ammonia or other solutions, comprising a siphon tube, a nipple having a constricted neck, and an intermediate bent tube and bulb supporting said siphon and nipple in elevated position.

7. A tube for siphoning, weighing and subsequent titration of acids, ammonia or other solutions, comprising a tapering capillary siphon tube, a nipple and an intermediate tube having a bulb and bent in shape to support the respective ends of the tube in elevated position to permit weighing of the liquid contents without leakage or loss by evaporation.

8. A tube for siphoning, weighing and subsequent titration of acids, ammonia or other solutions, comprising a capillary siphon tube having an oval supporting bulb and a nipple connected to and supported by said bulb.

9. A siphon weighing tube.

10. A tube for siphoning, weighing and subsequent titration of acids, ammonia or other solutions, comprising a capillary siphon tube having a supporting tubular base and a nipple connected to and supported by said base.

11. A tube for siphoning, weighing and subsequent titration of acids, ammonia or other solutions, comprising a tapering capillary siphon tube having a supporting tubular base and a nipple connected to and supported by said base.

12. The herein described process which consists in siphoning a quantity of liquid into a weighing tube, wiping the adherent solution from the outside of the tube before weighing, weighing, emptying the tube, blowing gently through a rubber tube connected to the nipple of the weighing tube and completing washing of the tube by passing water through a tube connected to the nipple until all traces of the solution have been washed into the titrating dish.

HIRAM G. FULSHER.